United States Patent
Kitchen (10) Patent No.: US 10,791,682 B2
(45) Date of Patent: Oct. 6, 2020

(54) VEGETATION CUTTING AND CLEARING SYSTEM AND METHOD

(71) Applicant: Douglas Bruce Kitchen, Duncan (CA)

(72) Inventor: Douglas Bruce Kitchen, Duncan (CA)

( * ) Notice: Subject to any disclaimer, the term of this patent is extended or adjusted under 35 U.S.C. 154(b) by 0 days.

(21) Appl. No.: 15/428,037

(22) Filed: Feb. 8, 2017

(65) Prior Publication Data

US 2018/0220599 A1    Aug. 9, 2018

(51) Int. Cl.
*A01G 23/081* (2006.01)

(52) U.S. Cl.
CPC .................... *A01G 23/081* (2013.01)

(58) Field of Classification Search
CPC .... A01G 23/08; A01G 23/083; A01G 23/087; A01G 23/091; A01G 23/095
See application file for complete search history.

(56) References Cited

U.S. PATENT DOCUMENTS

| | | |
|---|---|---|
| 1,053,730 A | 2/1913 | Jensen |
| 3,495,637 A | 2/1970 | Walsh |
| 3,731,720 A * | 5/1973 | Moser .................. A01G 23/087 144/4.1 |
| 3,755,896 A | 9/1973 | Tommerup |
| 3,834,434 A | 9/1974 | Walsh |
| 3,931,676 A | 1/1976 | Merle |
| 4,006,528 A | 2/1977 | Katsuya |
| 4,538,405 A | 9/1985 | Alexandrino |
| 4,658,506 A | 4/1987 | Nilsson |
| 5,908,060 A * | 6/1999 | Fargeot ................. A01G 23/083 144/24.13 |
| 7,690,880 B2 * | 4/2010 | Honeyman ........... E02F 3/3631 37/468 |
| 8,146,628 B2 * | 4/2012 | Tucker .................. A01G 23/087 144/34.1 |
| 8,992,159 B2 * | 3/2015 | Sintek ..................... B66C 1/427 414/741 |
| 2005/0028382 A1 | 2/2005 | Nakadate et al. |
| 2006/0289178 A1 | 12/2006 | Basek |
| 2013/0247386 A1 | 9/2013 | Ishikawa |
| 2014/0261890 A1 * | 9/2014 | Lindbom ............... A01G 23/08 144/336 |

* cited by examiner

*Primary Examiner* — Matthew Katcoff
(74) *Attorney, Agent, or Firm* — Argus Intellectual Enterprise; Daniel Enea; Jordan Sworen (57) ABSTRACT

A vegetation clearing device relating to the clearing of small-caliper vegetation, the vegetation clearing device having a grapple configured to releasably grapple the small-caliper vegetation, a cutter configured to cut the small-caliper vegetation engaged within the grapple, a support frame configured to support the grapple and the cutter, a coupler configured to removably couple the support frame to a working arm of a tractor, the coupler having a first pivot enabling pivoting of the support frame about a first rotational axis and a second pivot enabling pivoting of the support frame about a second rotational axis, the second rotational axis being non-parallel with the first rotational axis, a power-driven grapple actuator configured to actuate the releasable grappling by the grapple, and a power-driven rotator configured to rotate the support frame about the second rotational axis.

7 Claims, 10 Drawing Sheets

VEGETATION CUTTING AND CLEARING SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of apparatus for felling trees and brush of existing art and more specifically relates to shearing apparatus specially adapted for felling trees and brush.

2. Description of Related Art

Invasive species include plants, animals, or pathogens that are non-native to the ecosystem of a geographic region and whose introduction causes or is likely to cause harm. Substantial amounts of time and energy are spent in the attempt to control and eradicate invasive plant and animal species. The impacts of invasive species on our natural ecosystems and economy has been estimated to be in the billions of dollars each year. Many of our commercial, agricultural, and recreational activities depend on healthy native ecosystems. For example, aggressively invasive plant species, such as Scotch Broom (*Cytisus scoparius*), quickly forms dense stands of vegetation, which crowd out native species, destroy wildlife habitat, and greatly reduces the value of public rangeland and grasslands. Since being introduced to North America in the 1800s, broom bush has spread along the Atlantic coast from Nova Scotia to Massachusetts, Delaware, Virginia, and Georgia; and along the Pacific coast from central California north to British Columbia; and inland to Idaho, Montana, and Utah.

It is clear that invasive plant species pose one of the single largest threats to the world's natural resources and commercial economies. Improved systems and methods for the control of such invasive species would be of great benefit to many.

Attempts have been made to solve the above-mentioned problems such as those found in European Pat. No. EP2014154 to Kraaijeveld et al. The patent to Kraaijeveld et al. relates to a device for cutting down a tree trunk. The described device for cutting down a tree trunk includes a gripping claw for gripping the tree trunk and a felling means for felling the tree trunk, wherein the gripping claw comprises a frame, at least two gripping shells extending from the frame, of which at least one gripping shell is connected movably to the frame, and a gripping claw drive, wherein the movable gripping shell can be moved by means of the gripping claw drive between an open position, in which a tree trunk can be placed between the gripping shells, and a closed position in which the tree trunk can be clamped between the gripping shells. The device is distinguished in that the felling means is connected movably to at least one of the gripping shells, wherein the felling means can be moved between a protected position, in which the felling means lies within the periphery of the gripping shell connected thereto, and an unprotected position in which the felling means lies outside the periphery of the gripping shell connected thereto.

This art is representative of apparatus specially adapted for felling trees of existing art. However, the device of Kraaijeveld et al. fails to disclose or suggest the particular combination of structures and arrangements of the presently disclosed system.

BRIEF SUMMARY OF THE INVENTION

In view of the foregoing disadvantages inherent in the known apparatus specially adapted for felling trees and brush art, the present disclosure provides a novel vegetation cutting and clearing system and method. The general purpose of the present disclosure, which will be described subsequently in greater detail, is to provide a vegetation cutting and clearing system and method.

In accordance with a preferred embodiment hereof, this system provides a vegetation clearing device relating to the clearing of small-caliper vegetation, the vegetation clearing device comprising a grapple configured to releasably grapple the small-caliper vegetation, a cutter configured to cut the small-caliper vegetation engaged within the grapple, a support frame configured to support the grapple and the cutter, a coupler configured to removably couple the support frame to a working arm of a tractor, the coupler having a first pivot enabling pivoting of the support frame about a first rotational axis and a second pivot enabling pivoting of the support frame about a second rotational axis, the second rotational axis being non-parallel with the first rotational axis, a power-driven grapple actuator configured to actuate the releasable grappling by the grapple, and a power-driven rotator configured to rotate the support frame about the second rotational axis.

The system may further include a hydraulic-fluid distribution assembly configured to distribute a hydraulic working fluid between the power-driven grapple actuator and a source of the hydraulic working fluid. The grapple may include a pair of capture jaws, each capture jaw movably mounted on the support frame for movement toward and away from each other to grapple the small-caliper vegetation therebetween. The cutter may include a shear assembly having a shear blade movably mounted on the support frame. A power-driven shear-blade actuator may be configured to actuate movement of the shear blade, wherein the power-driven shear-blade actuator may be hydraulically actuated. The power-driven shear-blade may include a pivot point and cutting edges on the opposite sides of the pivot point. In this arrangement, the cutting edges intersect at the pivot point. In one embodiment of the system, the cutting edges are curved.

Both the power-driven grapple actuator and the power-driven rotator may be hydraulically actuated. The hydraulic-fluid distribution assembly may include at least one releasable hydraulic coupler configured to releasably couple the hydraulic-fluid distribution assembly with a source of the hydraulic working fluid of the tractor. In most applications, the tractor provides the source of the hydraulic working fluid.

The support frame may include a vegetation positioner configured to assist in positioning the small-caliper vegetation engaged within the grapple within a cutting path of the cutter. The coupler may include a quick-attach coupler structured and arranged to form a quickly attachable and detachable coupling with a quick-attach assembly of the working arm of the tractor. The quick-attach coupler may include a pair of spaced-apart parallel plates, the plates defining a first slot adapted for engagement upon a first pin of the quick-attach assembly, a second slot adapted for engagement upon a second pin of the quick-attach assembly, and at least one releasable retainer to assist the retention of the first slot and the second slot on the respective pins. The quick-attach coupler may be configured to couple with a quick-attach assembly having a standard quick-attach configuration of the manufacturer of the tractor. The second rotational axis may be perpendicular to the first rotational axis, and the support frame may be adapted to rotate 180 degrees about the second rotational axis.

Moreover, it provides such a vegetation clearing device, further comprising set of instructions, and wherein the vegetation clearing device may be arranged as a kit.

In accordance with another preferred embodiment hereof, this system provides a vegetation clearing method, the method comprising the steps of: providing a vegetation clearing attachment for a working arm of a tractor, the vegetation clearing attachment adapted to clear small-caliper vegetation, and configuring the vegetation clearing attachment to include a grapple configured to releasably grapple the small-caliper vegetation, a cutter configured to cut the small-caliper vegetation engaged within the grapple, a support frame configured to support the grapple and the cutter, a coupler configured to removably couple the support frame to a working arm of a tractor, the coupler having a first pivot enabling pivoting of the support frame about a first rotational axis and a second pivot enabling pivoting of the support frame about a second rotational axis, the second rotational axis being non-parallel with the first rotational axis, a power-driven grapple actuator configured to actuate the releasable grappling by the grapple, and a power-driven rotator configured to rotate the support frame about the second rotational axis.

Additionally, it provides such a method further comprising the steps of configuring the coupler to comprise a quick-attach coupler structured and arranged to form a quickly attachable and detachable coupling with a quick-attach assembly of the working arm of the tractor, arranging the quick-attach coupler to comprise a pair of spaced-apart parallel plates, the plates defining a first slot adapted for engagement upon a first pin of the quick-attach assembly, a second slot adapted for engagement upon a second pin of the quick-attach assembly, and at least one releasable retainer to assist the retention of the first slot and the second slot on the respective pins, and adapting the quick-attach coupler to couple with the quick-attach assembly having a standard quick-attach configuration of the manufacturer of the tractor.

For purposes of summarizing the invention, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and methods of use for the present disclosure, a vegetation cutting and clearing system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to shearing apparatus specially adapted for felling tree and brush seedlings. and more particularly to a vegetation cutting and clearing system and method as used to improve the clearing of small-caliper vegetation.

Areas of Western Canada, such as Vancouver Island British Columbia, are over-run with invasive plant species, such as broom bush (Scotch Broom). Forest companies operating in these areas have been searching for an improved system to efficiently clear seedlings from the side of logging roads without the use of chemical herbicides or techniques physically damaging to the surrounding topography. The present system provides, generally speaking, a light and portable apparatus that may be used to cut broom bush, blackberry, and small seedlings up to four inches. The apparatus includes a cutting head that is attached to the end of the arm of a small excavator. The cutting head includes both an operable grapple and a specially-designed shear. In operation, the apparatus clamps on to the brush or tree then slices it at ground level leaving a stub of about one-inch height.

The apparatus can also be used to trim branches on trees up to about 15 feet (4.6 meters) in the air. The versatile system may also be used to selectively reach into a garden or similar delicate area and selectively remove broom bush, blackberry bush, or small trees.

Figure 1:
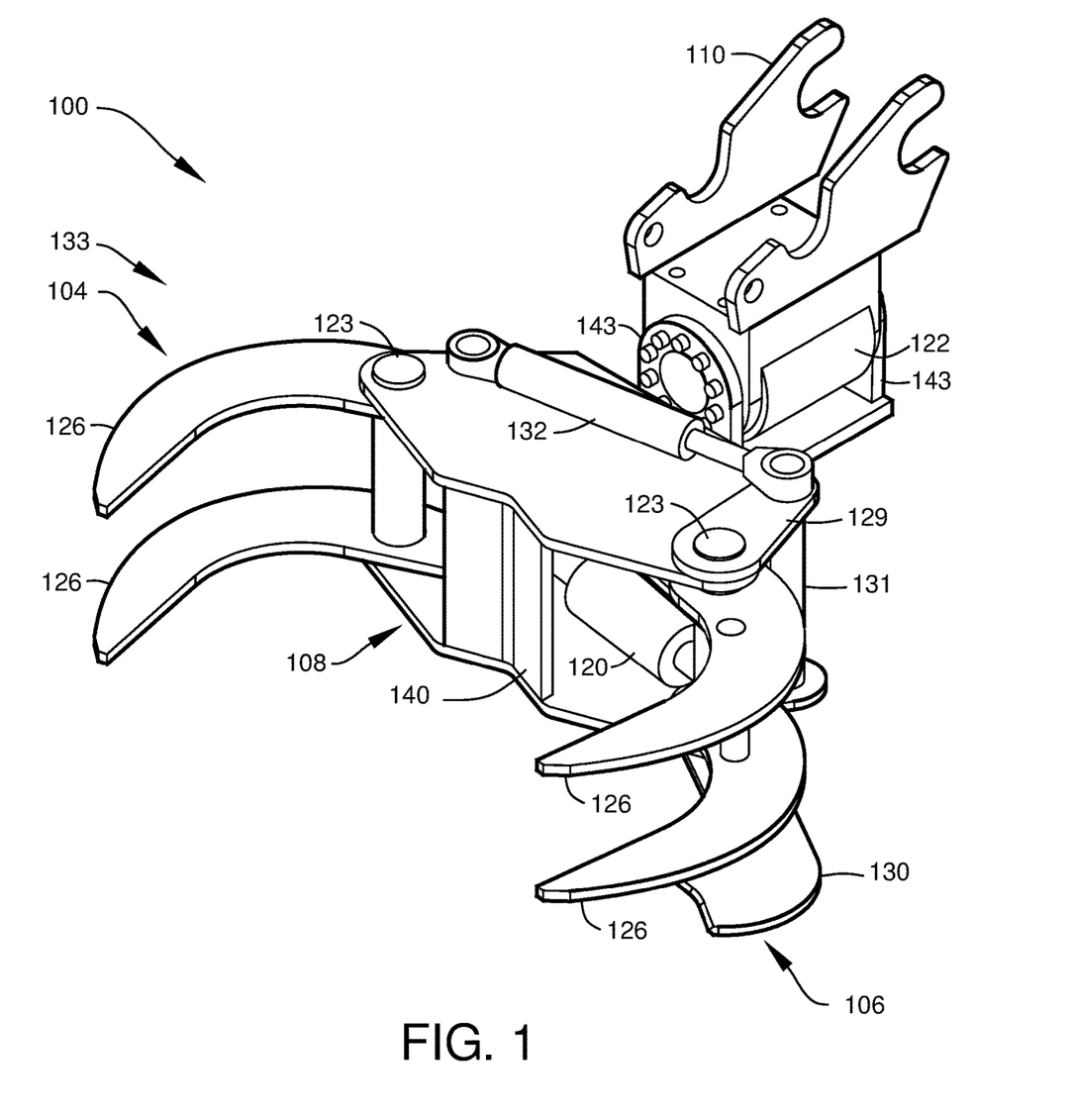
FIG. 1 is a perspective view of the vegetation clearing device, according to an embodiment of the disclosure.
Figure 2:
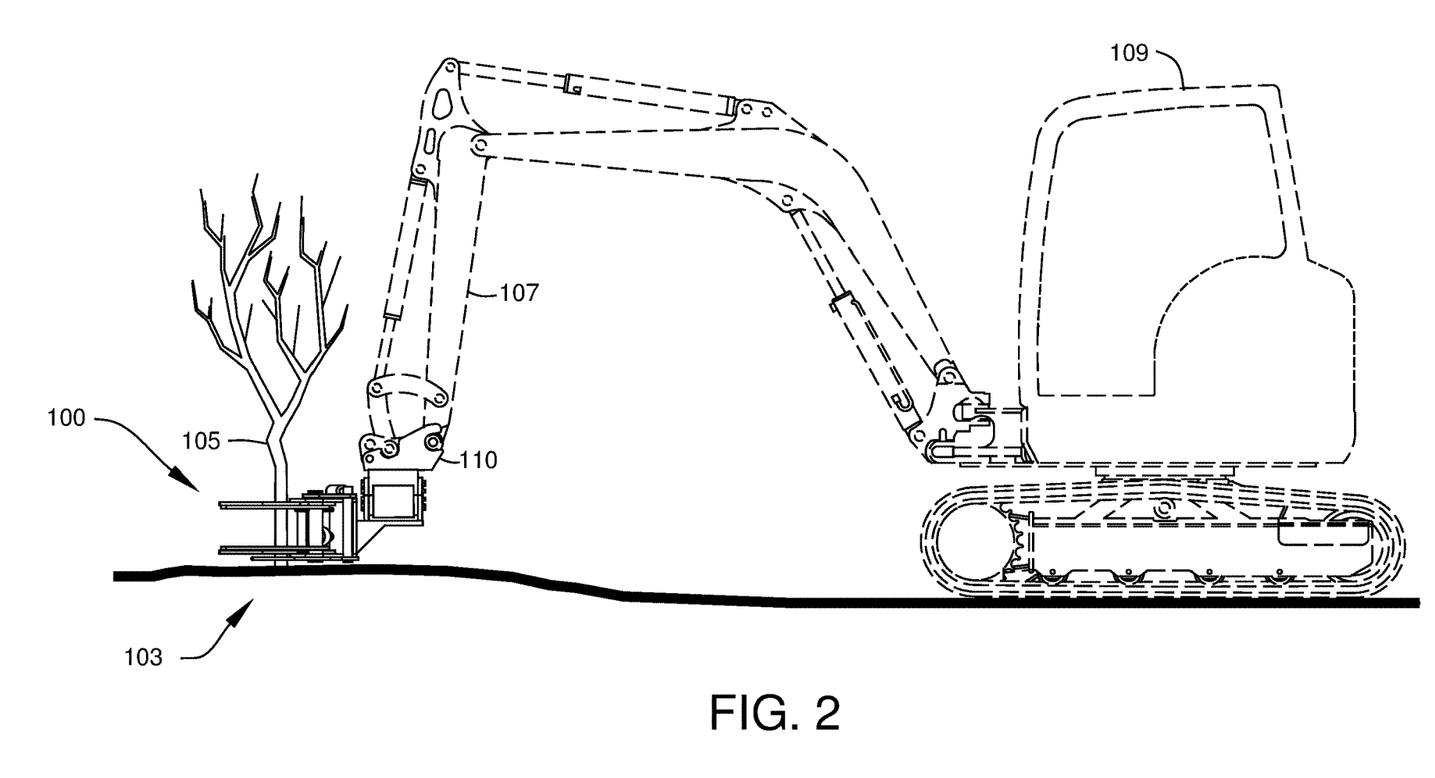
FIG. 2 is a side view of the vegetation clearing device of FIG. 1, during an 'in-use' condition, according to an embodiment of the disclosure.

Referring now more specifically to the drawings by numerals of reference, there is shown in FIGS. 1-14, various views of a vegetation clearing device 100 of the present system. FIG. 1 is a perspective view of a vegetation clearing device 100, according to an embodiment of the disclosure. FIG. 2 shows the vegetation clearing device 100 during an 'in-use' condition 103, according to an embodiment of the present disclosure. Here, the vegetation clearing device 100 may be beneficial for clearing small-caliper vegetation 105 using a tractor 109, as shown. In preferred embodiments of the present disclosure, the vegetation clearing device 100 is configured to be attachable to a working arm 107 of a small excavator-type tractor 109, as shown. It is noted that tractors suitable for use as tractor 109 include the KX and U series compact excavators produced by the Kubota Tractor Corporation of Grapevine Tex., USA. Upon reading this specification, it should be appreciated that, under appropriate circumstances, considering such issues as user preferences, design preference, marketing preferences, cost, availability, technological advances, etc., other equipment arrangements such as, for example, alternate tractor manufactures, adapting the system to larger or smaller tractors, adapting the system to alternate tractor types, development of proprietary tractor platforms, etc., may be sufficient.

As illustrated, the vegetation clearing device 100 may include a grapple 104, a cutter 106, and a support frame 108 to support the grapple 104 and the cutter 106. The grapple 104 is configured to releasably grapple the small-caliper vegetation 105 to be removed. The grapple 104 may include a pair of capture jaws 126, each capture jaw 126 movably mounted on the support frame 108 for movement toward and away from each other to grasp and hold the small-caliper vegetation 105.

Figures 3, 4, 5:
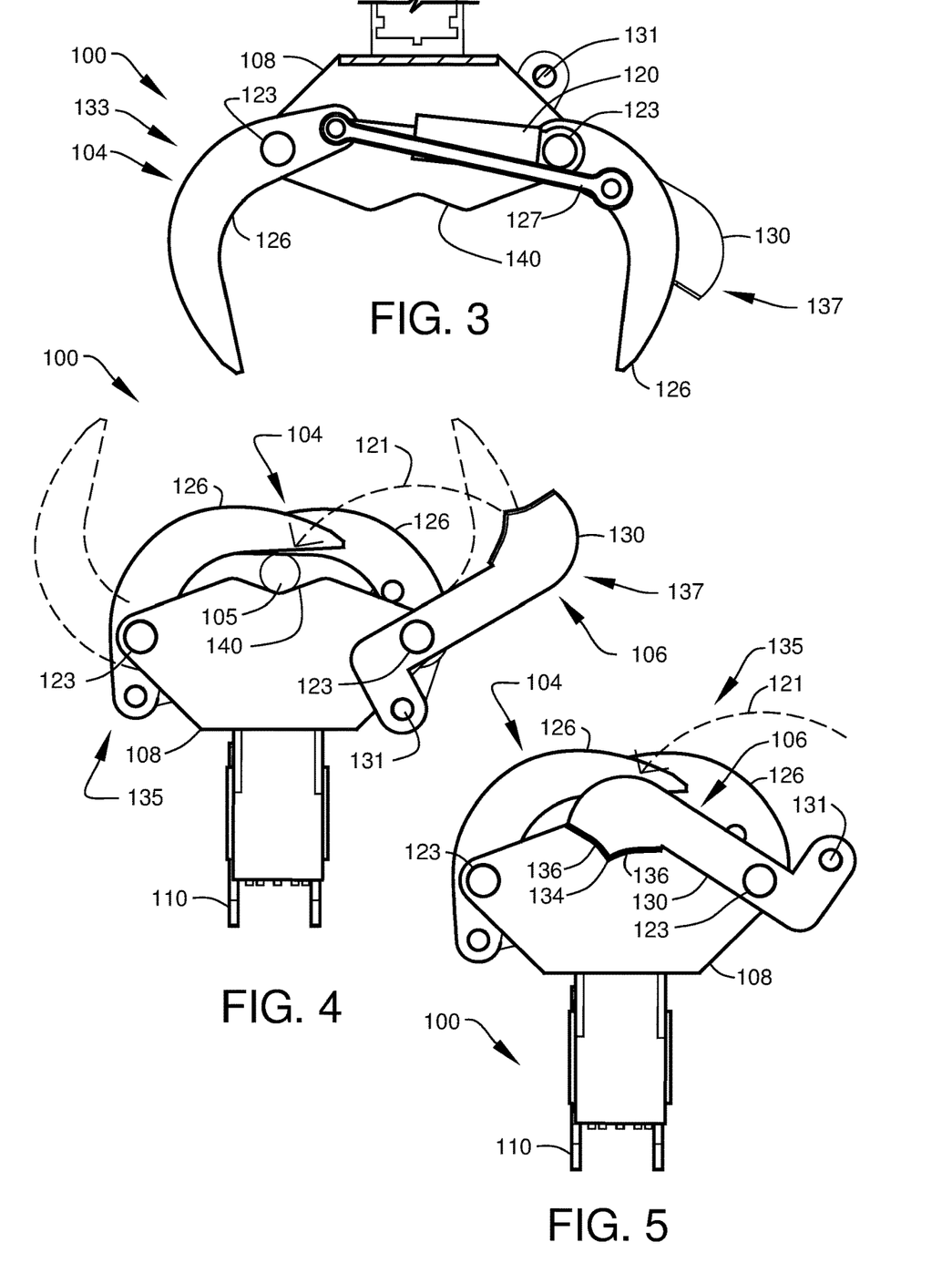
FIG. 3 is a diagrammatic sectional view, illustrating the operational mechanics of the vegetation clearing device of FIG. 1, according to an embodiment of the present disclosure.
FIG. 4 is a bottom view, illustrating the operation of a shear blade of the vegetation clearing device of FIG. 1, according to an embodiment of the present disclosure.
FIG. 5 is a bottom view, illustrating the operation of a cutting blade of the vegetation clearing device of FIG. 1, according to an embodiment of the present disclosure.

FIG. 3 is a diagrammatic sectional view, illustrating the operational mechanics of the vegetation clearing device 100 of FIG. 1, according to an embodiment of the present disclosure. Each capture jaw 126 is pivotally mounted to the support frame 108 at a respective pivot point 123 to allow for opening and closing of the capture jaws 126. A power-driven grapple actuator 120 is provided to actuate the releasable grappling by the grapple 104. In the presently-disclosed embodiment, the power-driven grapple actuator 120 is a hydraulic cylinder that extends between one of the pivot points 123 and one of the capture jaws 126, as shown. Concurrent actuation of the opposing capture jaw 126 is enabled by a link rod 127 extending between the capture jaws 126, as shown. Upon reading this specification, it should be appreciated that, under appropriate circumstances, considering such issues as user preferences, design preference, structural requirements, marketing preferences, cost, available materials, etc., other actuator arrangements such as, for example, providing one hydraulic cylinder at each capture jaw, etc., may be sufficient. In the illustrations of FIG. 1 through FIG. 3, the capture jaws 126 are arranged in an open position 133. When the grapple opens both arms will open about 180 degrees. When the grapple 104 closes, the capture jaws 126 cross pressing the vegetation against the support frame 108, as shown in FIG. 4.

FIG. 4 is a bottom view, illustrating the operation of a shear blade 130 of the vegetation clearing device 100 according to the embodiment of FIG. 1. In the illustration of FIG. 4, the capture jaws 126 are arranged in a closed position 135 capturing the small-caliper vegetation 105 within the grapple 104. As the capture jaws 126 of the grapple 104 move from the open position 133 (see FIG. 3) to the closed position 135, the small-caliper vegetation 105 is drawn toward the center of the support frame 108, as shown. To further assist in positioning the small-caliper vegetation 105 within a cutting path 121 of the cutter 106, the support frame may include a central recess identified herein as vegetation positioner 140. The vegetation positioner 140 may include a rigid backing plate which may be constructed from multiple evenly-space blocks that form a concave shape. This arrangement assures that the vegetation within the grapple 104 is located within the cutting path 121.

FIG. 5 is a bottom view, illustrating the operation of a shear blade 130 of the vegetation clearing device of FIG. 1, according to an embodiment of the present disclosure. The cutter 106 is configured to cut the small-caliper vegetation 105 (see FIG. 4) engaged within the grapple 104. In the present disclosure, term "small-caliper shall" be understood to include vegetation with a perennial stem (trunk) having a diameter less than about five inches. Although the illustrations show a single stem or trunk positioned within the grapple 104, it is noted that the apparatus may gather and cut multiple stems or trunks.

The cutter 106 may include a shear assembly having a shear blade 130 movably mounted on the support frame 108. In FIG. 3 and FIG. 4, the shear blade 130 is located in a retracted position 137. Referring again to FIG. 1, a power-driven shear-blade actuator 132 is provided to actuate movement of the shear blade 130. The shear-blade actuator 132 may be a hydraulic cylinder connected on one end to the top of the support frame 108 and on the other end to the shear blade 130 by means of a pivot arm 129 and link shaft 131, as shown. Upon reading this specification, it should be appreciated that, under appropriate circumstances, considering such issues as user preferences, design preference, structural requirements, marketing preferences, cost, available materials, technological advances, etc., other size arrangements such as, for example, providing units capable of grasping and cutting larger trucks, etc., may be sufficient.

Figure 6:
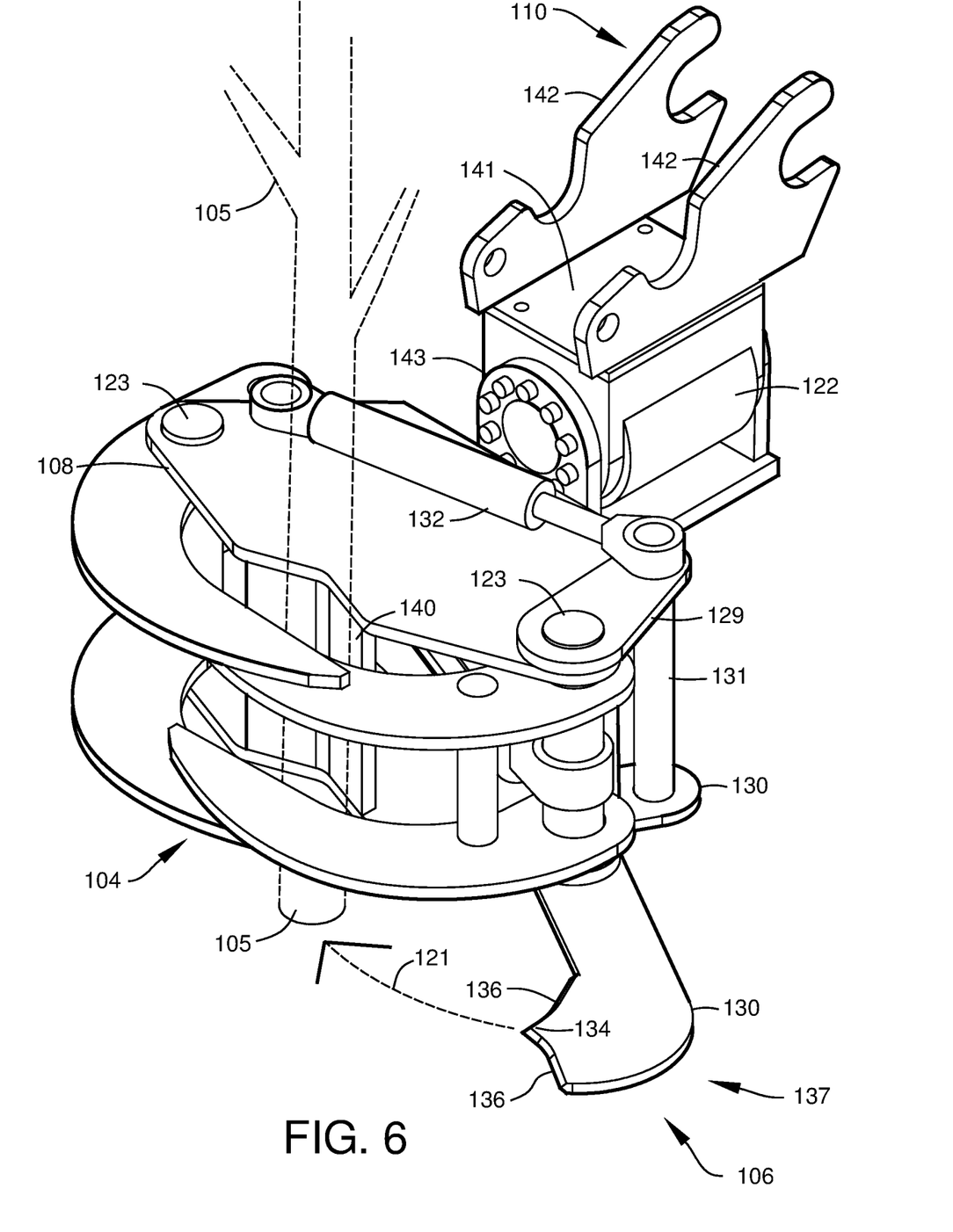
FIG. 6 is a perspective view, illustrating the cutting operation of the vegetation clearing device of FIG. 1, according to an embodiment of the present disclosure.

FIG. 6 is a perspective view, illustrating the cutting operation of the vegetation clearing device of FIG. 1, according to an embodiment of the present disclosure. In the illustration of FIG. 6, the shear-blade actuator 132 is shown moving the shear blade 130 along the cutting path 121 from the retracted position 137 to the shearing position 139 of FIG. 5. The shear blade 130 is configured to cut any small-caliper vegetation 105 held within the grapple 104 that is located along the cutting path 121. During the cutting operation, the vegetation is held in place by the strong force of the grapple, so very little bend in vegetation is allowed. This enables the hydraulically-actuated shear blade 130 to cut vegetation having a branch or trunk diameter up to about 4-½ inches (about 11.4 centimeters).

The shear blade 130 may include a pivot point 134 and cutting edges 136 on the opposite sides of the pivot point 134. In this arrangement, the cutting edges 136 intersect at the pivot point 134. In one embodiment of the system, the cutting edges 136 are curved. The pivot point 134 acts as a pivot during cutting. The shear blade 130 may be constructed of hardened steel, with stainless steel being preferred to resist the buildup of sap from oily vegetation such as scotch broom.

Figure 7:
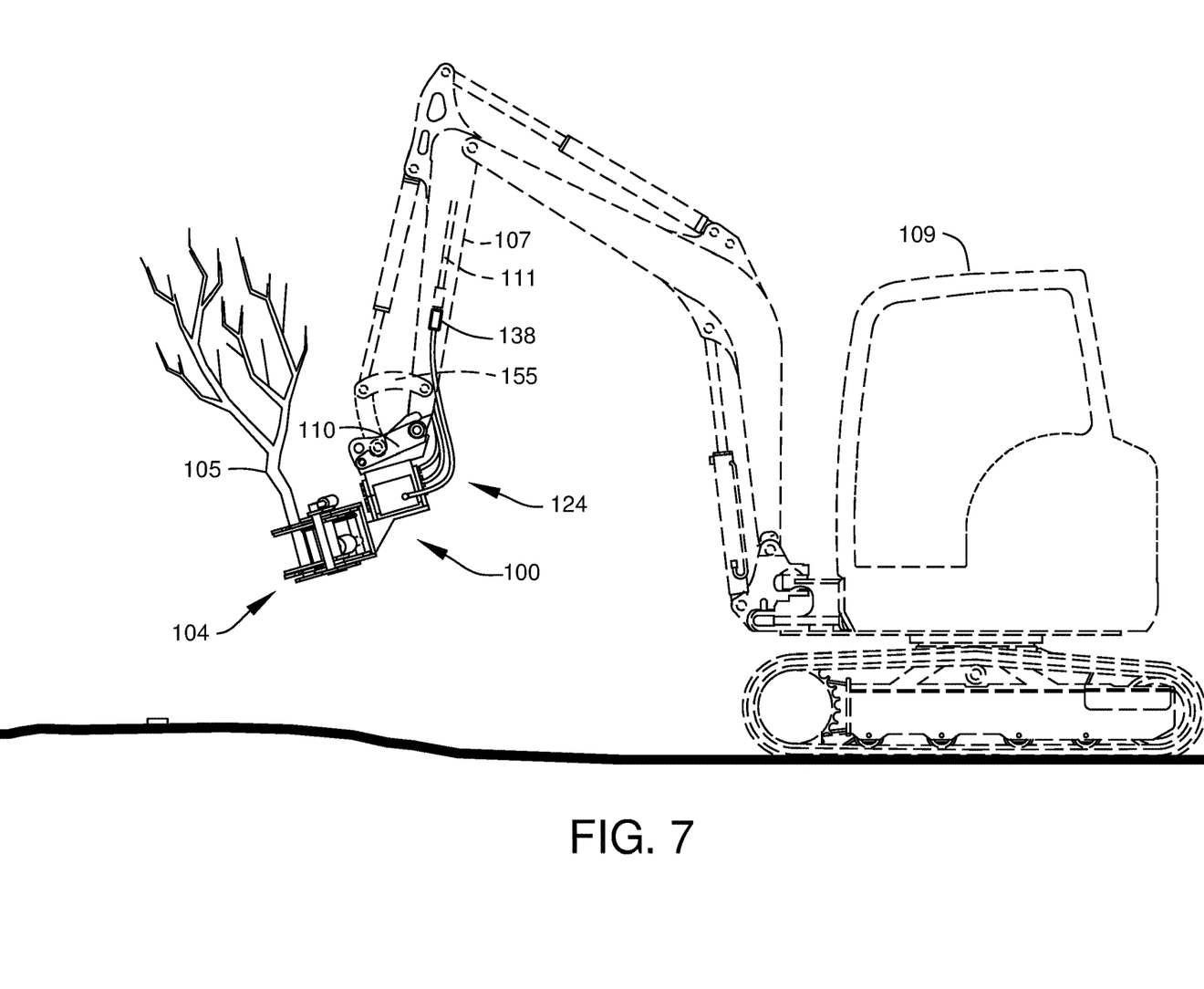
FIG. 7 is a side view of the vegetation clearing device of FIG. 1, during another 'in-use' condition, according to an embodiment of the disclosure.

FIG. 7 is a side view of the vegetation clearing device of FIG. 1, during an 'in-use' condition 103, according to an embodiment of the disclosure. Once the cutter 106 has cut the small-caliper vegetation 105, the material can be lifted away for subsequent processing, as shown. The boom-mounted apparatus may also be used to reach up and trim over hanging branches. The apparatus can trim branches on trees up to about 15 feet (4.6 meters) in the air. The versatile system may also be used to selectively reach into a garden or similar delicate area and selectively remove broom bush, blackberry bush or small trees.

Figure 8:
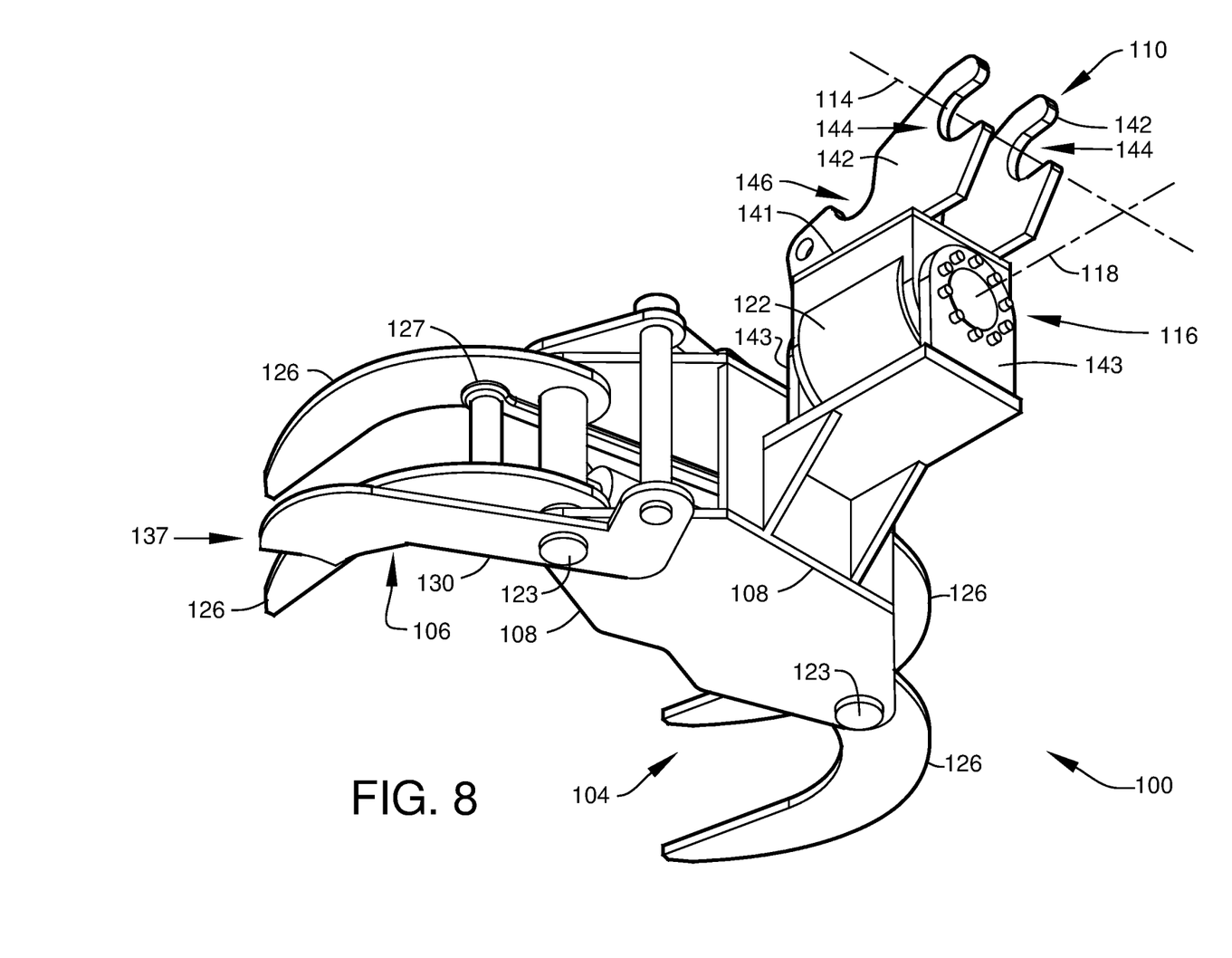
FIG. 8 is a bottom perspective view of the vegetation clearing device of FIG. 1, according to an embodiment of the present disclosure.
Figure 9:
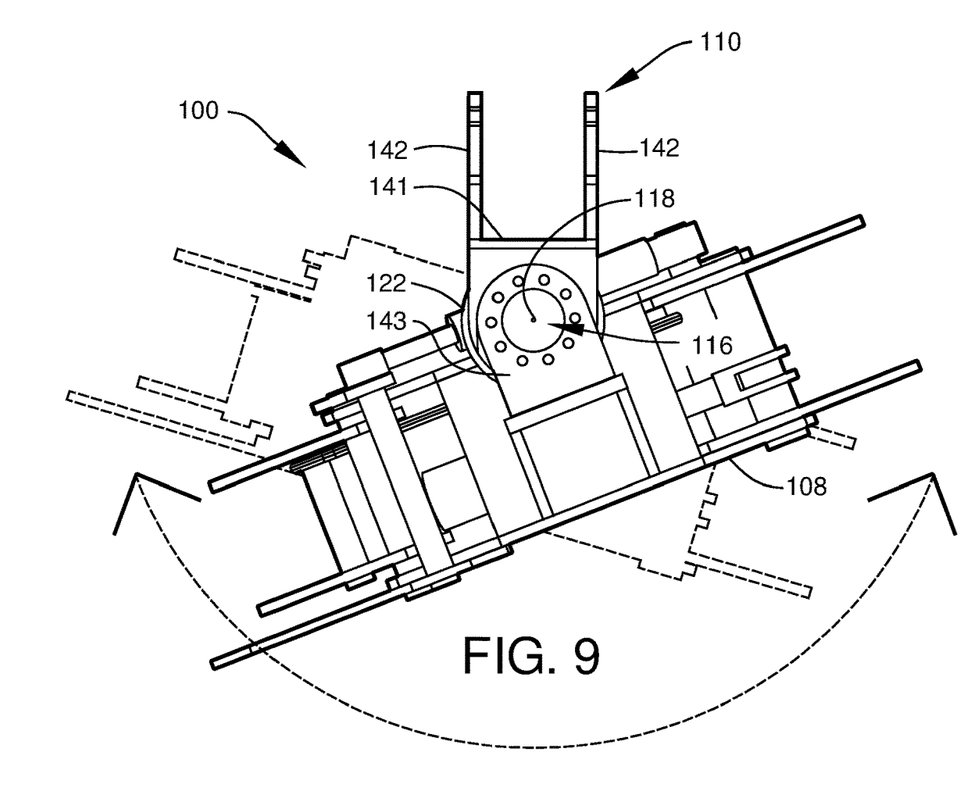
FIG. 9 is a rear view, illustrating a pivoting capability of the vegetation clearing device of FIG. 1, according to an embodiment of the present disclosure.

FIG. 8 is a bottom perspective view of the vegetation clearing device 100 of FIG. 1, according to an embodiment of the present disclosure. Visible in FIG. 8 is a coupler 110, a rotator 122, the support frame 108, the grapple 104, and the cutter 106. Also visible in FIG. 8 is a first rotational axis 114 and second rotational axis 118 of the vegetation clearing device 100. The power-driven rotator 122 is positioned between the coupler 110 and the support frame 108 and enables powered rotation of the support frame 108, grapple 104, and cutter 106 about the second rotational axis 118. The rotator 122 may be configured to allow the cutter assembly to rotate about 90-degrees left or right about the second rotational axis 118, as generally illustrated in the rear view of FIG. 9. The power-driven rotator 122 may be a commercially-available unit. Rotator units suitable for use as rotator 122 include products produced by the Helac Corporation of Enumclaw Wash. USA. In the presently-discloses embodiment, the base of the rotator 122 is bolted to the bottom plate 141 of the coupler 110, as shown. The end plates 143 are bolted to the rotator 122, as shown. The remaining assembly plates extending to the support frame 108 are assembled using thermally-welded connections.

Figure 10:
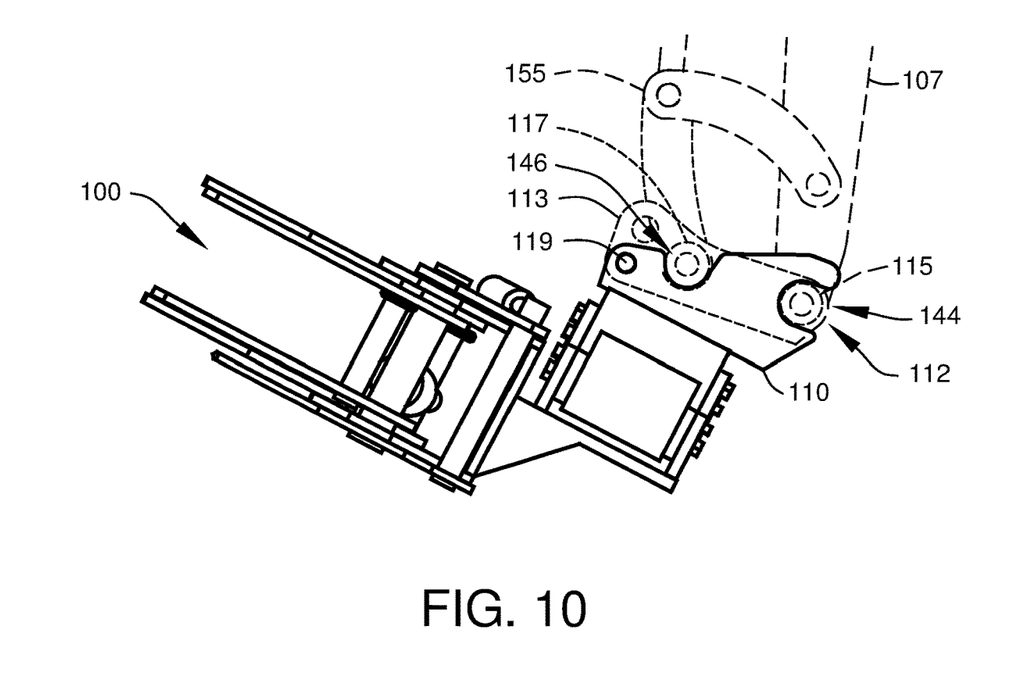
FIG. 10 is a side view, illustrating a pivoting capability of the vegetation clearing device of FIG. 1, according to an embodiment of the present disclosure.
Figures 11, 12:
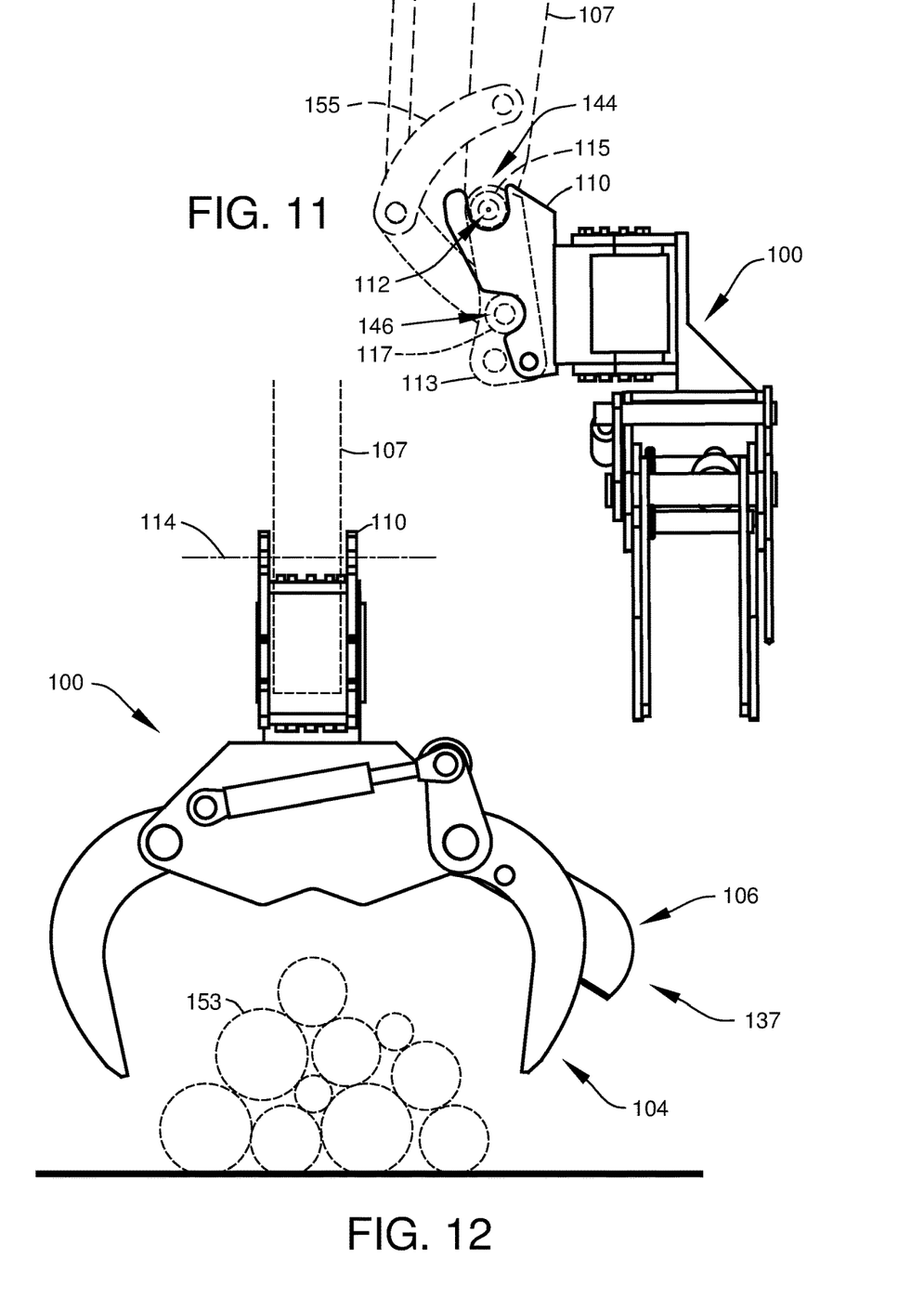
FIG. 11 is a side view, further illustrating the pivoting capability of the vegetation clearing device of FIG. 1, according to an embodiment of the present disclosure.
FIG. 12 is a side view, illustrating a secondary grappling capability of the vegetation clearing device of FIG. 1, according to an embodiment of the present disclosure.

FIG. 10 and FIG. 11 are side views, illustrating an additional pivoting capability of the vegetation clearing device 100 of FIG. 1. The coupler 110 may include a first pivot 112 enabling pivoting of the support frame 108 about the first rotational axis 114. The rotator 122 of the coupler may form a second pivot 116 enabling pivoting of the support frame 108 about the second rotational axis 118. It is noted that the second rotational axis 118 is non-parallel with the first rotational axis 114. More specifically, the second rotational axis 118 may be perpendicular to the first rotational axis 114, and the support frame 108 may be adapted to rotate about 180 degrees about the second rotational axis 118

The coupler 110 may be supplied as a quick-attach coupler structured and arranged to form a quickly attachable and detachable coupling with a quick-attach assembly 113 of the working arm 107 of the tractor 109. The quick-attach coupler 110 may include a pair of spaced-apart parallel plates 142, the plates 142 defining a first slot 144 adapted for engagement upon a first pin 115 of the quick-attach assembly 113, a second slot 146 adapted for engagement upon a second pin 117 of the quick-attach assembly 113, and at least one releasable retainer 119 to assist the retention of the first slot 144 and the second slot 146 on the respective pins. The quick-attach coupler 110 may be configured to couple with a quick-attach assembly 113 having a standard quick-attach configuration of the manufacturer of the tractor 109.

FIG. 12 is a side view, illustrating a secondary grappling capability of the vegetation clearing device 100 of FIG. 1, according to an embodiment of the present disclosure. The grapple 104 works independently of the cutter 106 so that when the cutter 106 is in the retracted position 137, the grapple 104 can be used for picking up material 153 located on the ground, as shown.

The vegetation clearing device 100 includes a hydraulic-fluid distribution assembly 124 (shown diagrammatically in FIG. 7). With specific reference to FIG. 7, the hydraulic-fluid distribution assembly 124 functions to direct a hydraulic working fluid 111 to the hydraulically-actuated components of the apparatus. The hydraulic-fluid distribution assembly 124 may include an arrangement of hydraulic-fluid lines including at least one releasable hydraulic coupler 138 configured to releasably couple the hydraulic-fluid distribution assembly 124 with a source of the hydraulic working fluid 111. In most applications, the tractor 109 provides the source of such hydraulic working fluid 111.

As described herein, the hydraulic-fluid distribution assembly 124 provides an operational interface between the hydraulic system of the tractor 109 and the hydraulically-actuated functions of the vegetation clearing device 100. These functions include the tipping back and forth of the apparatus about the first rotational axis 114, as shown in FIG. 10 and FIG. 11, the operation of the rotator 122, the grapple 104, and the operation of the shear assembly 128. The tipping of the vegetation clearing device 100 about the first rotational axis 114 is enabled using the same hydraulic cylinder and bucket-tipping linkage 155 used to operate an excavator bucket (not shown). The hydraulics operating the grapple 104 may be enabled by adding an auxiliary hydraulic circuit to the tractor 109. Operation of the shear assembly 128 by the shear shear-blade actuator 132 may be enabled by an existing auxiliary hydraulic circuit of the tractor 109. For example, the shear shear-blade actuator 132 may be controlled by the existing thumb-operated auxiliary switch of a Kubota compact excavator. In this application, the thumb hydraulics uses a proportional slide switch, thus allowing the speed of the shear to be controlled by the rate of thumb movement by the user.

Operation of the rotator 122 may be enabled by adding an additional auxiliary hydraulic circuit supplied by the manufacturer of the rotator 122. In this implementation, smaller joy stick may be added to one of the main joy sticks. Alternately, the manufacturer of the tractor 109 may add extra buttons on the joy sticks of the machine, as required. Those with ordinary skill in the art will now appreciate that upon reading this specification and by their understanding the art of equipment hydraulics as described herein, methods of implementing such hydraulic systems will be understood by those knowledgeable in such art.

Figure 13:
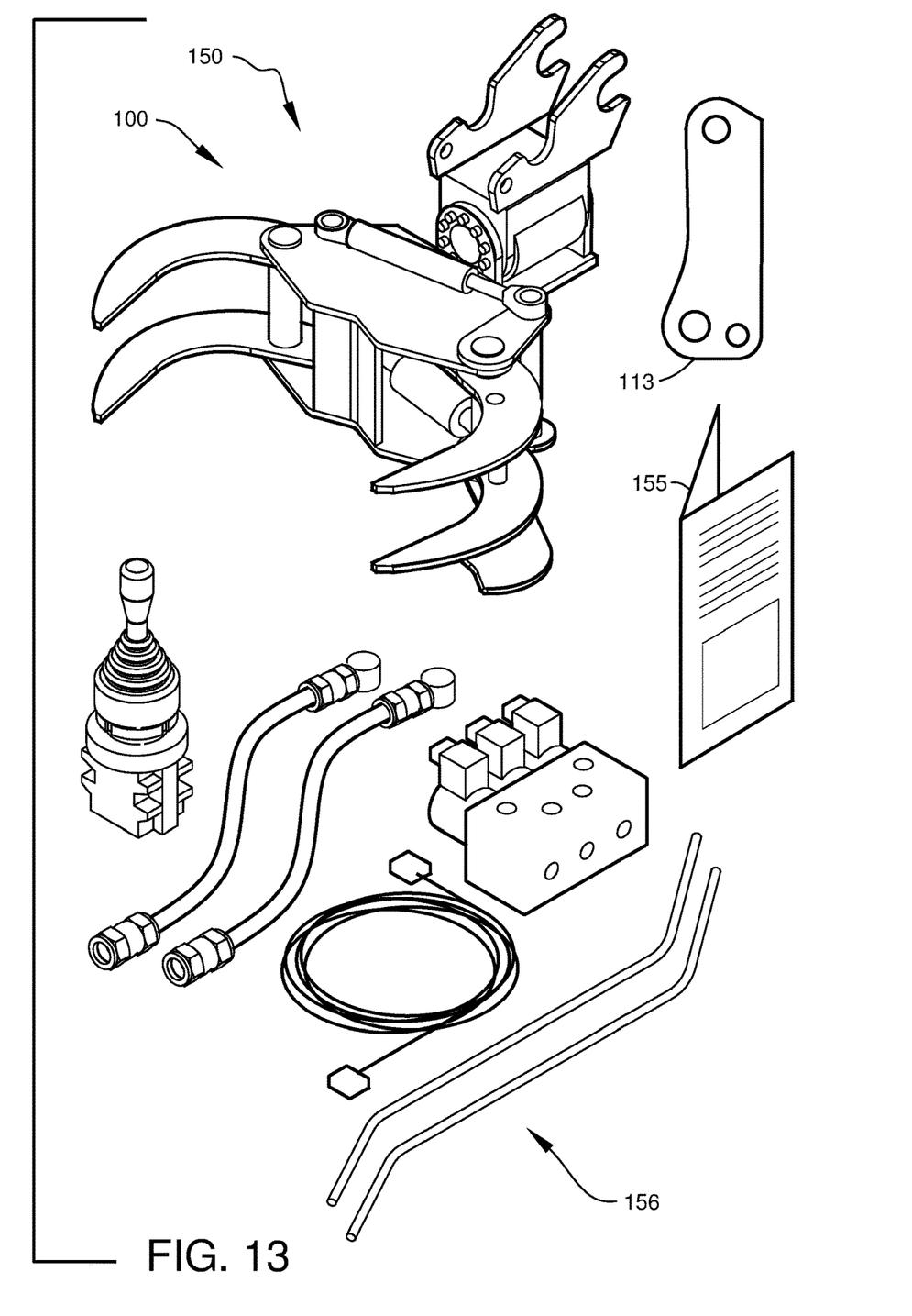
FIG. 13 is a perspective diagram, illustrating the vegetation clearing device of FIG. 1 arranged as a kit, according to an embodiment of the present disclosure.

FIG. 13 is a perspective diagram, illustrating the vegetation clearing device 100 of FIG. 1 arranged as a kit 150, according to an embodiment of the present disclosure. According to one embodiment, the vegetation clearing device 100 may be arranged as a kit 150. The kit 150 may contain the vegetation clearing device 100 along with the above-described accessory components 156 needed to provide a fully operational system. In particular, the accessory components 156 may include hydraulic lines, couplers, valves joystick controls, electrical components, etc. In some embodiments of the kit 150, a coupler containing the coupling pins of the quick-attach assembly 113 may be included. Moreover, kit 150 may further include set of instructions 155. The instructions 155 may detail functional relationships in relation to the structure of the vegetation clearing device 100 (such that the vegetation clearing device 100 can be installed, used, maintained, or the like, in a preferred manner).

Figure 14:
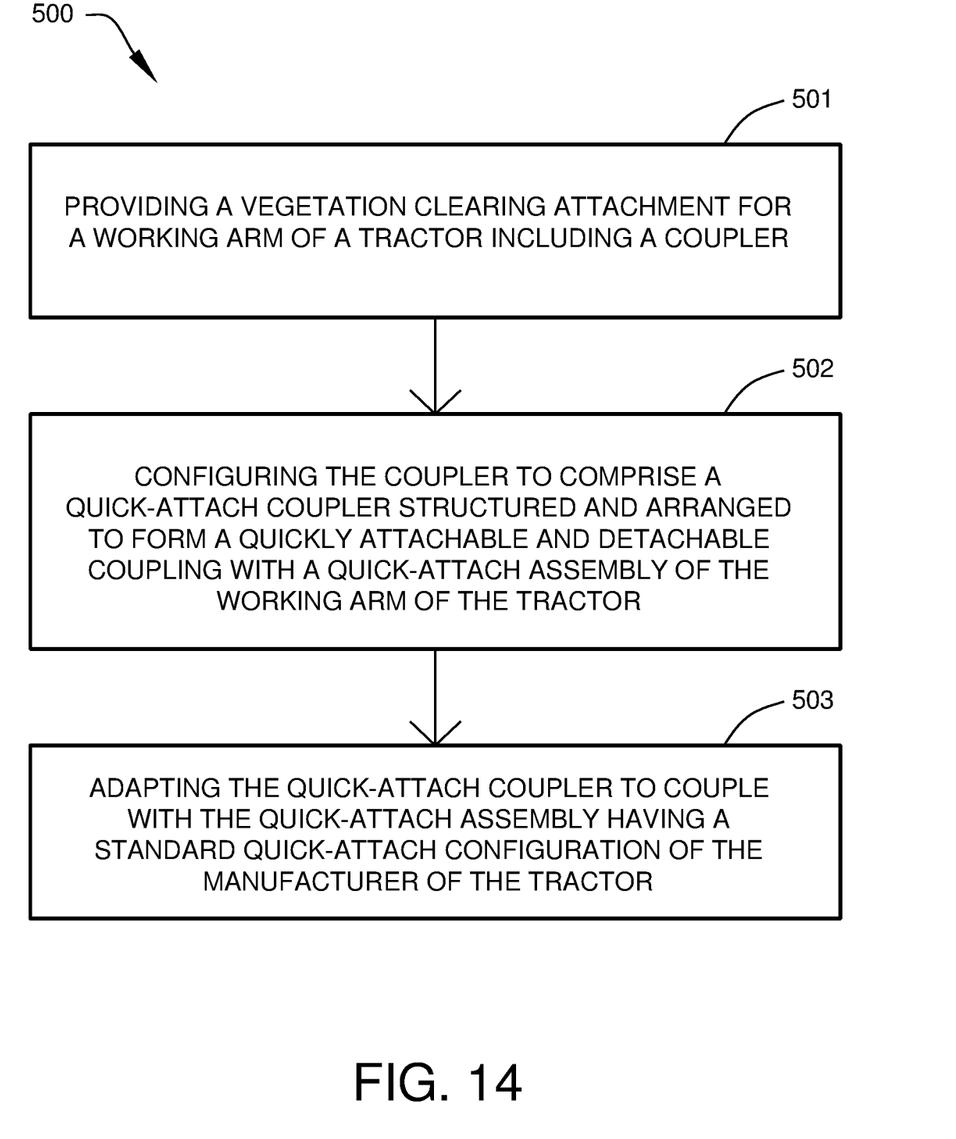
FIG. 14 is a flow diagram illustrating a method utilizing the vegetation clearing device of FIG. 1, according to an embodiment of the present disclosure.

FIG. 14 is a flow diagram illustrating a vegetation clearing method 500, according to an embodiment of the present disclosure. In particular, the method 500 may include one or more components or features of the vegetation clearing device 100 as described above. As illustrated, the method 500 may include the steps of: step one 501, providing a vegetation clearing attachment for a working arm of a tractor, the vegetation clearing attachment adapted to cut small-caliper vegetation, including configuring the vegetation clearing attachment to include a grapple configured to releasably grapple the small-caliper vegetation, a cutter configured to cut the small-caliper vegetation engaged within the grapple, a support frame configured to support the grapple and the cutter, a coupler configured to removably couple the support frame to a working arm of a tractor, the coupler having a first pivot enabling pivoting of the support frame about a first rotational axis and a second pivot enabling pivoting of the support frame about the second rotational axis, the second rotational axis being non-parallel with the first rotational axis, a power-driven grapple actuator configured to actuate the releasable grappling by the grapple, and a power-driven rotator configured to rotate the support frame about the second rotational axis; step two 502, configuring the coupler to comprise a quick-attach coupler structured and arranged to form a quickly attachable and detachable coupling with a quick-attach assembly of the working arm of the tractor, arranging the quick-attach coupler to comprise a pair of spaced-apart parallel plates, the plates defining a first slot adapted for engagement upon a first pin of the quick-attach assembly, a second slot adapted for engagement upon a second pin of the quick-attach assembly, and at least one releasable retainer to assist the retention of the first slot and the second slot on the respective pins; and step three 503, adapting the quick-attach coupler to couple with the quick-attach assembly having a standard quick-attach configuration of the manufacturer of the tractor.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other vegetation clearing methods (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vegetation clearing device for clearing small diameter vegetation, the vegetation clearing device comprising:
    a grapple configured to releasably grapple the small diameter vegetation;
    the grapple comprising a pair of left jaws and a pair of right jaws, each jaw adapted to transition between an open position and a closed position, wherein the pairs of jaws are adapted to cooperatively enclose around the small diameter vegetation in the closed position;
    wherein the left pair of jaws rotate about a left pivot point and the right pair of jaws rotate about a right pivot point;
    wherein the pair of left jaws and a pair of right jaws are operably connected via a link shaft that is aligned with the left and right pivot points, respectively;
    a support frame configured to support the grapple and a cutter, wherein the support frame comprises a vegetation positioner, the vegetation positioner comprises a backing plate extending from the top to the bottom of the support frame and having a centrally located concave recess sized to partially receive the small diameter vegetation collected by the grapple wherein the concave recess extends entirely between a lower end and an upper end of the vegetation positioner;
    wherein the cutter forms a lowermost position of the vegetation clearing device such that the cutter is configured to cut the small diameter vegetation engaged within the grapple in a shear position from a ground level such that a stub of no more than one-inch height extends from the ground level after cutting of the small diameter vegetation;
    the cutter comprising a shear blade disposed at a first end thereof;
    wherein the shear blade comprises a pilot point facing the concave recess in the shear position, wherein a pair of edges extend from adjacent sides of the pilot point;
    wherein the cutter is coupled to a cutter link shaft at the second end thereof;
    wherein the cutter is independently operable from the pair of jaws;
    wherein a cutter actuator is operably connected to the cutter such that actuation thereof causes the cutter to transition between a retracted position and the shear position;
    wherein a first end of the cutter actuator is mounted to the support frame and the second end operably connected to the cutter link shaft;
    a pivot arm secured to the left pivot point at a first end and to the cutter link shaft at a second end, such that the second end of the cutter link shaft rotates about the left pivot point.

2. The vegetation clearing device of claim 1, wherein the vegetation positioner forms a pair of projections adjacent the concave recess, such that the small diameter vegetation is collected within the concave recess.

3. The vegetation clearing device of claim 1, wherein the cutter rotates about the left pivot when transitioning between the shear position and the retracted position.

4. The vegetation clearing device of claim 1, further comprising a jaw actuator, wherein the jaw actuator is a linear actuator having a first end disposed to the left link shaft and the second end disposed to a proximal end of the pair of right jaws via the right link shaft;
    wherein the right link shaft is intermediate the proximal end and a distal end of the pair of right jaws;
    wherein a link rod extends between the proximal end of the pair of right jaws and an intermediate portion of the left pair of jaws, wherein the intermediate portion of the left pair of jaws is disposed between the left pivot point and a distal end of the left pair of jaws;
    wherein actuation of the linear actuator causes the pair of right and left jaws to cooperatively move to the closed position.

5. The vegetation clearing device of claim 1, wherein the shear blade rotates towards the vegetation positioner in the shear position such that the shear blade bears against the small diameter vegetation and the vegetation positioner.

6. The vegetation clearing device of claim 5, wherein the cutter comprises a length such that the pilot point aligns with the vegetation positioner in the shear position.

7. The vegetation clearing device of claim 1, further comprising:
- a coupler configured to removably couple the support frame to a working arm of a tractor, the coupler comprising a pair of parallel plates operably connected to a rotator;
- the couple configured to rotate the grapple and the cutter about a first rotational axis, wherein the first rotational axis extends between the pair of parallel plates;
- the rotator configured to rotate the grapple and the cutter about a second rotational axis, wherein the second rotational axis extends perpendicular to the first rotational axis and extends between the concave recess of the vegetation positioner and the parallel plates such that the pair of right jaws and the pair of left jaws are adapted to be selectively offset from the ground level.

* * * * *